Jan. 3, 1928.  A. SOKOL ET AL  1,655,027
APPARATUS FOR MANUFACTURING CELLULOID WATCH CRYSTALS
Filed May 21, 1926  2 Sheets-Sheet 1
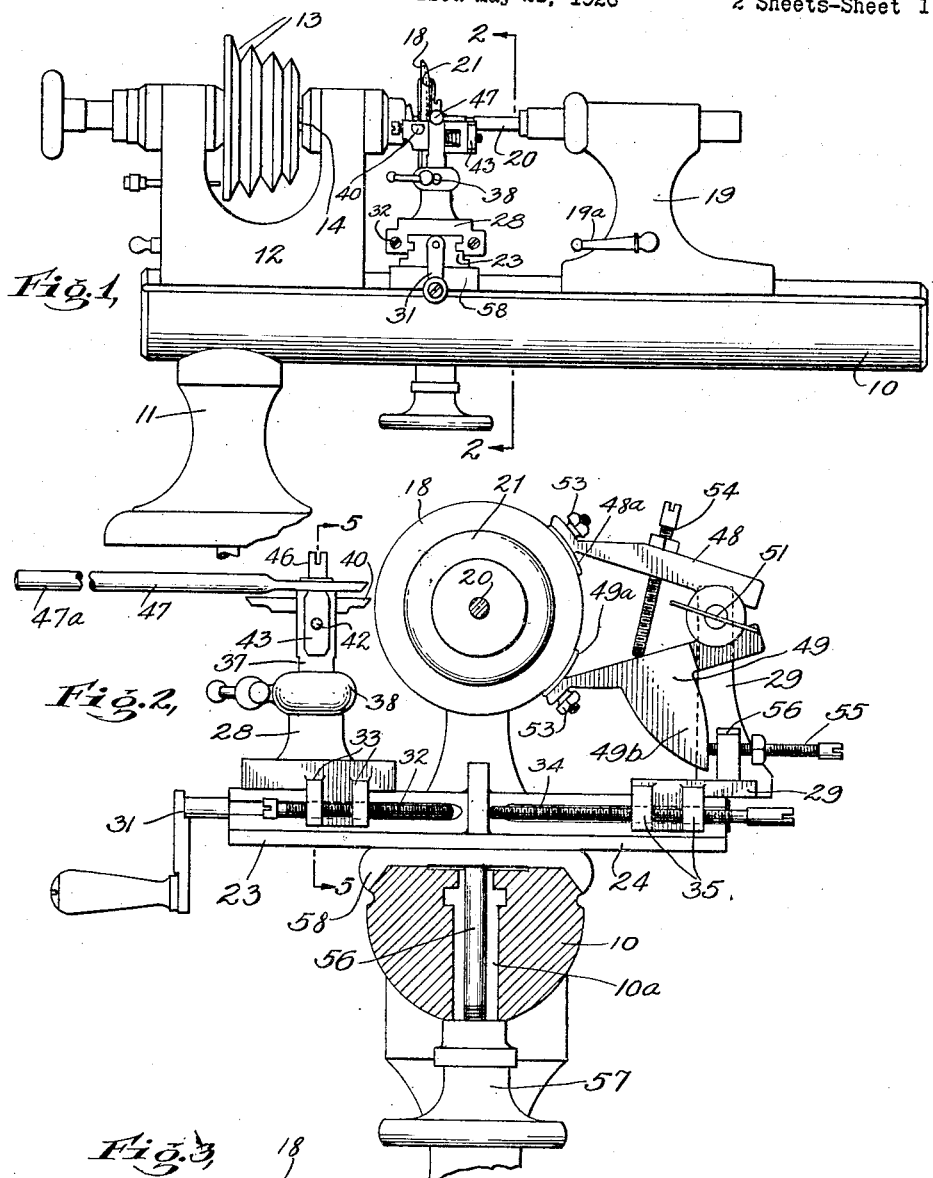

Jan. 3, 1928.　　　　A. SOKOL ET AL　　　　1,655,027
APPARATUS FOR MANUFACTURING CELLULOID WATCH CRYSTALS
Filed May 21, 1926　　　2 Sheets-Sheet 2
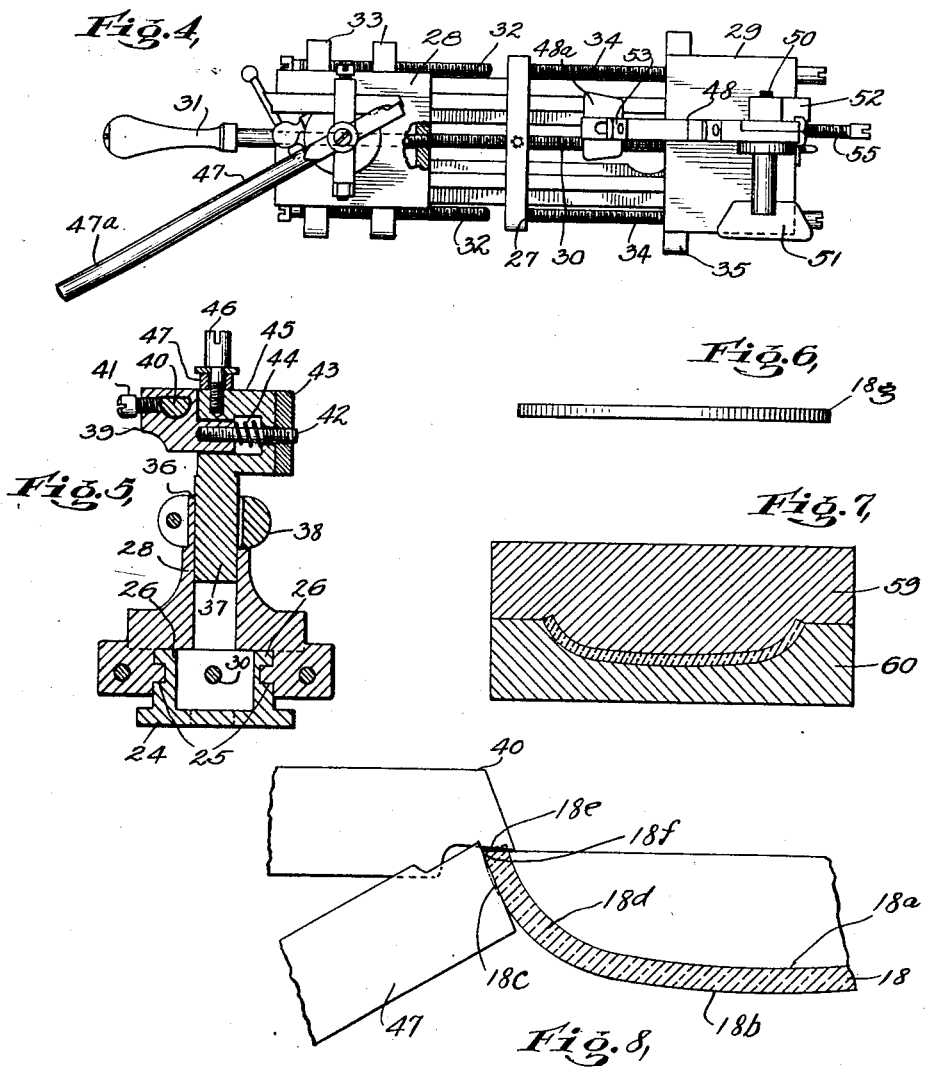

Patented Jan. 3, 1928.

1,655,027

UNITED STATES PATENT OFFICE.

ABRAHAM SOKOL AND MORRIS PRESENT, OF ASTORIA, NEW YORK.

APPARATUS FOR MANUFACTURING CELLULOID WATCH CRYSTALS.

Application filed May 21, 1926. Serial No. 110,777.

This invention relates to apparatus for making what are known as celluloid watch crystals and particularly to the formation of such crystals in accordance with a simple and efficient method; and the object of the invention is to provide an apparatus of the class specified comprising a mechanism adapted to be supported in connection with a lathe or other turning machine and adjustable thereon relatively to the operative parts of the lathe; a further object being to provide a mechanism having means for centering workpieces or crystals of different sizes in the machine and with reference to the axis of the lathe chuck and with means for gripping the workpiece between the chuck and the adjustable workpiece support of the lathe; a still further object being to provide a mechanism employing cutting tools with means for moving the same toward and from a crystal supported in the lathe and for moving the crystal centering means of said mechanism out of engagement with the crystal to permit of the free rotation thereof and further to the provision of means for stopping the movement of said cutter devices and centering means in both directions; a still further object being to provide a mechanism wherein the centering means consists of a plurality of adjustable parts with means for retaining said parts in predetermined position of adjustment and still further to the provision of means for adjusting the position of the cutter devices with reference to the centering means or with reference to the crystal supported within said mechanism; a further object being to provide an apparatus of the class and for the purpose specified which is constructed and operated in such manner as to cut on the periphery of a celluloid watch crystal, surfaces disposed at an angle to each other to produce crystals of a given and accurate diameter and having peripheral faces which will facilitate the mounting of the crystal in connection with a watch and to retain the same against displacement therefrom; and with these and other objects in view, the invention consists in an apparatus of the class specified for manufacturing watch crystals in accordance with the method hereinafter more fully described and claimed.

The invention is fully disclosed in the following specification, of which the accompanying drawing forms a part, in which the separate parts of our improvement are designated by suitable reference characters in each of the views, and in which:

Fig. 1 is a side view of a part of a lathe showing our improved mechanism mounted in connection therewith, and illustrating the method of its use.

Fig. 2 is a partial section on the line 2—2 of Fig. 1 and on an enlarged scale.

Fig. 3 is a sectional detail view of the crystal gripping means employed in the lathe for retaining the workpiece in predetermined position.

Fig. 4 is a plan view of our improved mechanism as seen in Figs. 1 and 2 with the crystal detached.

Fig. 5 is a section on the line 5—5 of Fig. 2.

Fig. 6 is a side edge view of a blank disk of celluloid from which our improved crystal is formed.

Fig. 7 is a view illustrating the method of forming the shape of the crystal by means of dies or molds; and, Fig. 8 is a diagrammatic view illustrating the manner of printing or cutting the peripheral edge of the crystal to properly fit a watch case and to bring said crystal to a proper size and contour.

In Figs. 1 and 2 of the drawing, we have indicated at 10, the bed plate or table of a lathe supported by a leg member 11 in connection with a table, workbench or other support. At 12, we have shown a stock or body on the top of the bed plate 10 of the lathe within which is mounted the usual drive shaft, a plurality of pulleys 13 being employed on said shaft to produce differential speed drives to the shaft 14. At 15, we have indicated the chuck at one end of the shaft 14 in connection with which we mount a workpiece supporting member 16 having a cushioned facing 17. The outer face of the member 16 or its cushioned facing 17 is convex to fit within the concave face 18ª of a celluloid crystal 18 as seen in Fig. 3 of the drawing. Mounted on the bed 10 of the lathe and adjustable longitudinally of the axis of the shaft 14 is a workpiece supporting body 19 having a shaft 20 in connection with which is supported a disk 21 having a friction facing 22 concaved in form and adapted to cooperate with the convex face 18$^b$ of a crystal 18. It will be understood that the body 19 is moved toward and from the chuck 15 to firmly grip the crystal 18 within and between the friction faces 17 and 22 as seen in Fig. 3 of the drawing and held in different positions of adjustment by suitable clamping means operated through a handle member 19$^a$ as seen in Fig. 1 of the drawing.

It will be understood that the size and construction of the lathe forms no part of our invention and that shown in the accompanying drawing is merely for the purpose of illustrating one use of our invention or method of carrying our invention into effect. In practice, we adjustably support in connection with the body 10 of the lathe a tool supporting and feeding mechanism 23 which includes a workpiece centering device. In the construction shown, the mechanism 23 comprises a frame 24 having channels 25 in the opposite side faces of upstanding members 26 thereon and extending from a central partitioning member 27 outwardly through the ends of said frame. A tool supporting block 28 is mounted at one end portion of the frame 24 and has keys adapted to engage the channels 25 to guide said block in its movement longitudinally of said frame. Another workpiece centering block 29 is similarly mounted in connection with the other end portion of said frame. These blocks are mounted upon a screw shaft 30 rotatably mounted in the partition wall 27 and in threaded engagement with each of the blocks 28 and 29 or that part of said blocks which extends into the space between the upstanding members 26. One of these engagements is shown at the left of Fig. 4 of the drawing where the block 28 is in threaded engagement with said screw shaft 30. The threads of the screw shaft 30 are continuous in one direction and the shaft is operated by a crank 31 at one end thereof. In the operation of said shaft in one direction, the blocks 28 and 29 are moved, for example, from left to right as pictured in Fig. 4 of the drawing, and in the reverse rotation of said shaft, said blocks are moved from right to left. Stop screws 32 are mounted in connection with ears 33 on the block 28 and are adapted to engage the partition wall 27 to limit the movement of the block 28 in one direction as well as the movement of the block 29 in the same direction. Other stop screws 34 are mounted in connection with ears 35 on the block 29 and are adapted to engage the partition wall 27 to limit the movement of the block 29 as well as the block 28 in the opposite direction. It will be understood that the relative movement of the blocks 28 and 29 is adjusted by means of the stop screws 32 and 34, and the spacing of the blocks is controlled by the mounting of the same on the feed screw 30.

On the block 28 is an upwardly directed and split tubular portion 36 within which is mounted a shaft 37 held in different positions of adjustment by a clamp 38 mounted upon the tubular portion 36. Supported in connection with the upper end of the shaft 37 is a tool supporting member 39 in which a tool 40 is mounted and fixed by means of a set screw 41, the member 39 being held tensionally in position in connection with the shaft 37 by means of a screw 42 having a nut 43 thereon and a spring 44 mounted in an extension 45 on said shaft. In the upper end of the shaft 37 is mounted a screw 46 for supporting another tool 47 in connection with said shaft. In the construction shown, the tool 47 is capable of movement on the screw 46 as a pivot or fulcrum and has a projecting handle portion 47$^a$ note Fig. 4 of the drawing, and is adapted for use in cutting a bevel 18$^c$ on the outer convex face 18$^b$ of the crystal 18 adjacent the periphery thereof and also adjacent the curved portion 18$^d$ formed in the crystal as later described, while the tool 40 is adapted to cut a straight edge 18$^e$ on the periphery of the crystal 18 or a slightly beveled edge, the bevel being directed inwardly with reference to the concave face 18$^a$ of the crystal to produce a relatively short outer corner 18$^f$ on the periphery of the crystal 18 as clearly seen in Fig. 8 of the drawing. It will be understood that the tool 40 may be adjusted toward and from a workpiece or crystal and with relation to the cutting face of the tool 47 and may also be adjusted laterally by means of the screw 42. It will also be apparent that both tools 40 and 47 may be collectively adjusted vertically in the tool block 28 by raising or lowering the shaft 37 therein.

The centering device mounted in connection with the block 29 comprises two adjustable arms 48 and 49 mounted upon a common pivot 50 and held in different positions of adjustment by the pivot 50 employed, which is a screw, operated by a wing nut 51 for clamping said arms together, the screw 50 being in threaded engagement with an upright member 52 on the block 29. The arms 48 and 49 are provided on their free ends with adjustable arc-shaped jaws 48$^a$ and 49$^a$ held in different positions of adjustment by nuts 53 to collectively form a predetermined arc of a circle or portions of such arc to provide a seat against which the periphery of a crystal may be placed in the manner seen in Fig. 2 of the drawing for properly centering said crystal with reference to the axis of the chuck 15 and shaft 20.

An adjustable screw 54 is mounted in connection with the arm 48 and cooperates with the arm 49 to adjust the relative positions of the arms 48 and 49 with relation to each other, while another screw 55 is mounted in connection with an ear 56 on the block 29 and cooperates with a cam member 49ᵇ on the arm 49 to support both arms 48 and 49 in predetermined raised position it being understood that by adjusting the screw 54, the arms 48 and 49 may be spaced apart a further degree or moved closer together while the adjustment of the screw 45 will either raise or lower said arms with reference to the position shown in Fig. 2 of the drawing.

A screw or rod 56 is supported in connection with the frame 24 and extends downwardly through an elongated slot 10ᵃ in the body 10 of the lathe to provide for the adjustment of the frame 24 longitudinally of said bed. A hand nut 57 is mounted upon the threaded end of the screw or rod 56 to retain the frame 20 in different positions of adjustment. A shoe 58 is preferably employed between the frame 24 and bed 10 to provide for the proper seating of the mechanism 23 upon the bed 10 of the lathe as will be apparent. In Fig. 6 of the drawing, we have shown a flat disk or blank 18ᵍ from which the crystal 18 is to be formed. In Fig. 7 of the drawing, we have shown the first step in the method of forming a crystal wherein the blank 18ᵍ is placed between two dies 59 and 60 which dies are brought together to bring the crystal into the form shown in Fig. 7 of the drawing and also partly illustrated in Fig. 8 of the drawing, wherein the concave face 18ᵃ and convex face 18ᵇ is formed as well as the curved peripheral portion 18ᵈ. After the crystal has been formed in the manner shown in Fig. 7, it being understood that the crystal blank 18ᵍ is first heated or heated in the dies, after which the dies are chilled, in order that the crystal may retain its given shape, the crystal is then placed in our improved mechanism 23 for turning off the peripheral edges thereof to form the bevels 18ᶜ and 18ᵉ.

As previously stated, the crystal 18 is centered in the machine or mechanism by means of the centering device consisting of the arms 48 and 49 and the shoes 48ᵃ and 49ᵃ thereof after which the disks 16 and 21 are brought together to firmly grasp the crystal within and between the same, the friction facings 17 and 22 serving to provide a positive grip of the crystal and insuring its rigid positioning in the lathe, after which the crank 31 is rotated to advance the tools 40 and 47 slightly and to move the jaws 48ᵃ and 49ᵃ of the arms 48 and 49 out of engagement with the crystal 18 after which the lathe is put into operation to rotate the crystal 18 at a comparatively high speed after which the advancement of the tools 40 and 47 is continued by the manipulation of the crank 31. This operation continues until the stop screws 32 engage the partition wall 27 and limit the inward movement of said tools, it being understood that the adjustment of the stop screws 32 functions to maintain predetermined diameters in the resulting crystals in the operation of cutting numerous crystals of a given size and construction. After the above cutting operation, the crank 31 is rotated in the opposite direction to withdraw the tools 40 and 47 after which the disk 21 is moved to the right to release the finished crystal 18 and a new crystal is substituted therefor, after which said screws 34 have been moved into engagement with the partition wall 27 to bring the arms 48 and 49 in proper position to center the new workpiece in the machine. The above operation is then repeated in the finishing of another crystal.

It will be understood, that in the accompanying drawing, the thickness of the crystal has been exaggerated in order to clearly illustrate the same. It will be apparent that our improved apparatus may be used for the purpose of manufacturing crystals of any size or dimensions, the disks 16 and 21 being modified when necessary to suit comparatively small or large sizes, and the arms 48 and 49 being adjusted by the several means employed to compensate for the size of the workpiece as well as the adjustment of the tools 40 and 47 employed. It will also be apparent that our invention is not necessarily limited to the specific details of construction herein shown and described and various changes therein and modifications thereof may be made within the scope of the appended claims without departing from the spirit of our invention or sacrificing its advantages.

The particular type of crystals produced in accordance with our method and apparatus are what are known as lentille-shaped crystals or crystals wherein the greater curvature is adjacent the peripheral portion thereof, the central portion being substantially straight, the curvature being very slight and sufficient to clear the ends of a watch, thus producing a neat and finished appearance to the watch when the crystal is mounted in connection therewith. It will be understood, however, that we are not necessarily limited to the specific cross sectional form of the crystal herein shown and described, nor is our invention limited to the particular beveled faces formed thereon by the cutting tools, it being understood that said tools may be adjusted and shaped to produce the desired result.

Having fully described our invention, what we claim as new and desire to secure by Letters Patent, is:—

1. An apparatus of the class described comprising in combination with a turning machine and means for supporting a disk-shaped workpiece in axial alinement with the chuck of the machine, of a mechanism adjustable longitudinally of the axis of the machine and cutting tools adjustable on said mechanism and movable toward and from a workpiece supported by said means, said mechanism including a centering device having relatively movable jaws for centering a work-piece within and between said supporting means, said jaws being arranged in a circumferential path, and means for adjusting said jaws toward and from each other to engage workpieces of different diameters.

2. An apparatus of the class described comprising in combination with a turning machine and means for supporting a disk-shaped workpiece in axial alinement with the chuck of the machine, of a mechanism adjustable longitudinally of the axis of the machine and cutting tools adjustable on said mechanism and movable toward and from a workpiece supported by said means, said mechanism including a centering device having relatively movable jaws for centering a workpiece within and between said supporting means, said jaws being arranged in a circumferential path, and means for adjusting said jaws toward and from each other to engage workpieces of different diameters, and said centering device being movable with said cutting tools, the same being movable out of engagement with the workpiece when the tools engage the same.

3. A tool support and workpiece centering mechanism for lathes comprising a tool supporting block and a centering device supporting block disposed at opposite sides of the longitudinal axis of the chuck of the lathe said blocks being relatively adjustable, and means for moving said blocks in one direction toward and away from a workpiece supported therebetween whereby in the movement of tools supported in the tool block into engagement with the workpiece, the centering device is moved out of engagement therewith and means involving a left and right hand screw for adjusting said blocks relatively to each other, and adjustable means for stopping the movement of said blocks in both directions.

4. A tool support and workpiece centering mechanism for lathes comprising a tool supporting block and a centering device supporting block disposed at opposite sides of the longitudinal axis of the chuck of the lathe said blocks being relatively adjustable, and means for moving said blocks in one direction toward and away from a workpiece supported therebetween whereby in the movement of tools supported in the tool block into engagement with the workpiece, the centering device is moved out of engagement therewith and means involving a left and right hand screw for adjusting said blocks relatively to each other, adjustable means for stopping the movement of said blocks in both directions, and said first named means comprising a feed screw in threaded engagement with both of said blocks, and a crank at one end of said screw for rotating the same.

5. A tool support and workpiece centering mechanism for lathes comprising a tool supporting block and a centering device supporting block disposed at opposite sides of the longitudinal axis of the chuck of the lathe, and means for moving said blocks in one direction toward and away from a workpiece supported therebetween whereby in the movement of tools supported in the tool block into engagement with the workpiece, the centering device is moved out of engagement therewith and means involving a left and right hand screw for adjusting said blocks relatively to each other, adjustable means for stopping the movement of said blocks in both directions, said first named means comprising a feed screw in threaded engagement with both of said blocks, and a crank at one end of said screw for rotating the same, and said centering device comprising relatively adjustable arms.

6. A tool support and workpiece centering mechanism for lathes comprising a tool supporting block and a centering device supporting block disposed at opposite sides of the longitudinal axis of the chuck of the lathe, and means for moving said blocks in one direction toward and away from a workpiece supported therebetween whereby in the movement of tools supported in the tool block into engagement with the workpiece, the centering device is moved out of engagement therewith, adjustable means for stopping the movement of said blocks in both directions, said first named means comprising a feed screw in threaded engagement with both of said blocks and a crank at one end of said screw for rotating the same, said centering device comprising relatively adjustable arms and means for adjusting said arms collectively to raise and lower the same.

7. A tool support and workpiece centering mechanism for lathes comprising a tool supporting block and a centering device supporting block disposed at opposite sides of the longitudinal axis of the chuck of the lathe, and means for moving said blocks in one direction toward and away from a workpiece supported therebetween whereby in the movement of tools supported in the tool block into engagement with the workpiece, the centering device is moved out of engagement therewith, adjustable means for stopping the movement of said blocks in both directions, said first named means comprising a feed screw in threaded engagement with both of said blocks and a crank at one end of said screw for rotating the same, said centering device comprising relatively adjustable arms, means for adjusting said arms collectively to raise and lower the same, and means for retaining said arms in predetermined positions of adjustment.

8. A tool support and workpiece centering mechanism for lathes comprising a tool supporting block and a centering device supporting block disposed at opposite sides of the longitudinal axis of the chuck of the lathe, and means for moving said blocks in one direction toward and away from a workpiece supported therebetween whereby in the movement of tools supported in the tool block into engagement with the workpiece, the centering device is moved out of engagement therewith, adjustable means for stopping the movement of said blocks in both directions, said first named means comprising a feed screw in threaded engagement with both of said blocks and a crank at one end of said screw for rotating the same, said centering device comprising relatively adjustable arms, means for adjusting said arms collectively to raise and lower the same, means for retaining said arms in predetermined positions of adjustment, and means for adjustably supporting two cutting tools in connection with the tool block.

9. A mechanism of the class described comprising a frame, a screw shaft extending longitudinally of the frame, independent blocks keyed to the frame disposed at opposite end portions of and in operative connection with said screw shaft whereby in the rotation of said shaft, said blocks are collectively moved in different directions depending upon the rotation of said shaft, adjustable means on each of said blocks and cooperating with said frame for limiting the movement of said blocks in both directions, and means for adjustably supporting two arms mounted upon a common pivot in connection with one of said blocks, said arms forming part of a workpiece centering device.

10. A mechanism of the class described comprising a frame, a screw shaft extending longitudinally of the frame, blocks keyed to the frame and in operative connection with the said screw shaft whereby in the rotation of said shaft, said blocks are collectively moved in different directions depending upon the rotation of said shaft, adjustable means on each of said blocks and cooperating with said frame for limiting the movement of said blocks in both directions, means for adjustably supporting a cutting tool in connection with one of said blocks, and means for adjustably supporting two arms mounted upon a common pivot in connection with one of said blocks, said arms forming part of a workpiece centering device.

11. An apparatus for cutting beveled faces on celluloid crystals comprising the combination with a turning machine, of means for centering a crystal in the machine with reference to the chuck thereof, said means comprising relatively adjustable jaw members arranged and adjusted in a circumferential path to adapt said jaw members to crystals of different diameters, means for moving said jaw members toward and from the workpiece, a tool supporting member adjustable relatively to and movable with said centering means and adapted in the movement of said jaw member out of engagement with the workpiece supported in the chuck, to move in the direction of the workpiece, and tools on said member for cutting a beveled edge on the workpiece.

In testimony that we claim the foregoing as our invention we have signed our names this 20th day of May, 1926.

ABRAHAM SOKOL.
MORRIS PRESENT.